US009488312B2

(12) United States Patent
Hofer et al.

(10) Patent No.: US 9,488,312 B2
(45) Date of Patent: Nov. 8, 2016

(54) PULSED PLASMA LUBRICATION DEVICE AND METHOD

(71) Applicant: United States of America as Represented by the Administrator of NASA, Washington, DC (US)

(72) Inventors: Richard R. Hofer, Monrovia, CA (US); Donald B. Bickler, Temple City, CA (US); Saverio A. D'Agostino, Santa Rosa Valley, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 424 days.

(21) Appl. No.: 14/151,684

(22) Filed: Jan. 9, 2014

(65) Prior Publication Data

US 2014/0190771 A1        Jul. 10, 2014

Related U.S. Application Data

(60) Provisional application No. 61/750,894, filed on Jan. 10, 2013.

(51) Int. Cl.
*F16N 39/00*        (2006.01)
*F16N 15/00*        (2006.01)
(Continued)

(52) U.S. Cl.
CPC .......... *F16N 39/005* (2013.01); *C10M 103/02* (2013.01); *C10M 103/04* (2013.01); *C10M 103/06* (2013.01); *C10M 107/10* (2013.01); *C10M 107/32* (2013.01); *C10M 107/38* (2013.01); *C10M 107/44* (2013.01); *C10M 171/00* (2013.01); *F16N 15/00* (2013.01);
(Continued)

(58) Field of Classification Search
CPC .. F16N 39/005; F16N 15/00; C10M 103/02; C10M 103/04; C10M 103/06; C10M 107/10; C10M 107/32; C10M 107/38; C10M 107/44; C10M 171/00; H05H 1/48
USPC ................................................. 184/50.2, 6.22
See application file for complete search history.

(56) References Cited

U.S. PATENT DOCUMENTS 3,447,322 A * 6/1969 Mastrup .................... F03H 1/00
                                                                 219/121.5
3,575,003 A * 4/1971 LaRocca .................. F02K 5/00
                                                                 60/203.1
(Continued)

OTHER PUBLICATIONS

NPO-47881, Richard R. Hofer, Donald B. Bickler, and Saverio A. D'Agostino of Caltech for NASA's Jet Propulsion Laboratory, NASA Tech Brief, Mar. 3, 2011.
(Continued)

*Primary Examiner* — Michael Riegelman
(74) *Attorney, Agent, or Firm* — Mark Homer

(57) ABSTRACT

Disclosed herein is a lubrication device comprising a solid lubricant disposed between and in contact with a first electrode and a second electrode dimensioned and arranged such that application of an electric potential between the first electrode and the second electrode sufficient to produce an electric arc between the first electrode and the second electrode to produce a plasma in an ambient atmosphere at an ambient pressure which vaporizes at least a portion of the solid lubricant to produce a vapor stream comprising the solid lubricant. Methods to lubricate a surface utilizing the lubrication device in-situ are also disclosed.

10 Claims, 14 Drawing Sheets

(51) Int. Cl.
| | |
|---|---|
| *H05H 1/48* | (2006.01) |
| *C10M 171/00* | (2006.01) |
| *C10M 103/02* | (2006.01) |
| *C10M 103/04* | (2006.01) |
| *C10M 103/06* | (2006.01) |
| *C10M 107/10* | (2006.01) |
| *C10M 107/32* | (2006.01) |
| *C10M 107/38* | (2006.01) |
| *C10M 107/44* | (2006.01) |

(52) U.S. Cl.
CPC ........ *H05H1/48* (2013.01); *C10M 2201/0413* (2013.01); *C10M 2201/053* (2013.01); *C10M 2201/0613* (2013.01); *C10M 2201/0653* (2013.01); *C10M 2201/0663* (2013.01); *C10M 2201/081* (2013.01); *C10M 2201/082* (2013.01); *C10M 2201/0803* (2013.01); *C10M 2201/1023* (2013.01); *C10M 2201/1033* (2013.01); *C10M 2205/0285* (2013.01); *C10M 2209/1023* (2013.01); *C10M 2209/1033* (2013.01); *C10M 2213/003* (2013.01); *C10M 2213/043* (2013.01); *C10M 2217/0443* (2013.01); *C10N 2210/01* (2013.01); *C10N 2210/02* (2013.01); *C10N 2210/04* (2013.01); *C10N 2210/06* (2013.01); *C10N 2210/07* (2013.01); *C10N 2210/08* (2013.01); *C10N 2250/08* (2013.01); *H05H 2240/10* (2013.01)

(56) References Cited

U.S. PATENT DOCUMENTS

| | | | | |
|---|---|---|---|---|
| 4,948,485 | A * | 8/1990 | Wallsten | B01J 19/088 204/164 |
| 5,327,998 | A * | 7/1994 | Rosado | F16C 33/6696 184/104.1 |
| 5,924,278 | A * | 7/1999 | Burton | F03H 1/0012 219/121.48 |
| 6,153,976 | A | 11/2000 | Spanjers | |
| 6,269,629 | B1 | 8/2001 | Spanjers | |
| 6,295,804 | B1 | 10/2001 | Burton et al. | |
| 6,373,023 | B1 * | 4/2002 | Hoskins | H05H 1/54 219/121.48 |
| 7,530,219 | B1 * | 5/2009 | Burton | F03H 1/0087 60/202 |
| 8,448,419 | B2 * | 5/2013 | Demmons | B05B 5/0255 313/231.01 |
| 8,742,282 | B2 * | 6/2014 | Asokan | H05H 1/52 219/121.36 |
| 2004/0261703 | A1 | 12/2004 | Kobrin et al. | |
| 2005/0217238 | A1 | 10/2005 | Land, III et al. | |
| 2009/0012523 | A1 | 1/2009 | Ruuttu et al. | |
| 2009/0134129 | A1 | 5/2009 | Robarge et al. | |

OTHER PUBLICATIONS

R.L. Burton, Pulsed Plasma Thruster, Journal of Propulsion and Power, vol. 14, No. 5, Sep.-Oct. 1998.
M.R.Hilton, Applications of Solid Lubricant Films in Spacecraft, Sep. 1, 1994,Aerospace Report No. TR-92(2935)-6.
C.R.Buhler, Electrical Breakdown in a Martian Gas Mixture. 34th Annual Lunar and Planetary Science Conference, Mar. 17-21, 2003.
Kazuhisa Miyoshi, Evaluation of Selected Solid Lubricating Films, Aug. 6, 2013, Nasa Technical Reports Server.
D.M. Mattox, The Foundations of Vacuum Coating Technology, ISBN: 0-8155-1495-6, 2003.
M.R.Hilton, Fracture in MoS2 Solid Lubricant Films, Sep. 1, 1995,Aerospace Report No. TR-94(4935)-6.
Mario Marchettin,In Situ, On-Demand Lubrication System Developed for Space Mechanisms, Jun. 25, 2003 National Research Council Report.
I.L.Singer, Advanced Solid Lubricant Films by ION-Beam Assisted Deposition NRL/MR/6170-94-7633, Nov. 28, 1994.
William R. Jones, CHPT 27—Lubrication for Space Applications, 2006, Taylor & Francis Group, LLC.
C.R. Buhler C.I. Calle, Chemical implications due to the low electrical breakdown in the Martian atmosphere, in: ProceedingsElectrostatics Society of America, 2003.
Talivaldis Spalvil, NASA TN D-4269 Deposition of Sputtered Molybdenum Disulfied Films and Friction Characteristics of Such Films in Vacuum, Dec. 1967.
Ajay Malshe, Novel Tech for Synth and Fab of Solid Lub AFRL-SR-AR-TR-04-0209, Mar. 2, 2004, US Airforce Report.
Talivaldis Spalvil, NASA TMX-52819 Friction Characteristics of Sputtered Sikud Film Lubricants Jun. 1970.
William R. Jones, Space Tribology, NASA-TM-2000-209924, Mar. 2000.
Alivaldis Spalvil, Influence of the Deposition Conditions on Radiofrequency Magnetron Sputtered MoS2 Films, NASA-TECH Paper 2994, Apr. 1990.
Robert L Fusaro, NASA Tech Memo 106392, Lubrication of Space Systems, May 1994.
Richard R. Hofer et al., In Situ Dry Lubrication Replenishment, Poster No. TA-25, 2010, NASA Pasadena, CA.

* cited by examiner

PULSED PLASMA LUBRICATION DEVICE AND METHOD

RELATED APPLICATIONS

This application claims the benefit of a related U.S. Provisional Application Ser. No. 61/750,894 filed Jan. 10, 2013, entitled "PULSED PLASMA LUBRICATOR (PPL) TECHNOLOGY FOR THE IN-SITU REPLENISHMENT OF DRY LUBRICANTS IN EXTREME ENVIRONMENTS" to Richard Hofer et al., the disclosure of which is incorporated by reference herein in its entirety.

GOVERNMENT RIGHTS

The instant disclosure described hereunder was made in the performance of work under a NASA contract, and is subject to the provisions of Public Law #96-517 (35 U.S.C. 202) in which the Contractor has elected not to retain title.

BACKGROUND

Numerous processes, operations and missions employ mobility systems and other moving mechanical assemblies, including terrestrial applications, and those on Mars, the Moon, and in deep space. Such operations require reliable operation of various mechanical assemblies and their tribological components. Wet lubricants may provide the lubrication necessary but may require various control systems to avoid solidification, application, and other functions. Dry lubricants have characteristics suitable for use in environments or in systems in which wet lubricants are not ideal. However, a major drawback of a dry lubricant is the low wear resistance that eventually leads to failure of the assembly as the lubricant is removed. The longevity of systems employing moving mechanical assemblies may be limited by the ability to maintain lubrication. A need clearly exists to provide in-situ lubrication to remote assemblies to extend the lifetime of the mechanical assemblies and systems.

Pulsed plasma thrusters have been in existence for a number of years and are well known in the art. Pulsed plasma thrusters function by creating a plasma between two electrodes and ablating a dry propellant proximate to the plasma, generating a gas which exits an orifice of the thruster producing a force. However, to maximize the output of the thruster, the ablation of the solid propellant is complete, rendering the utility of the resulting gas jet otherwise useless.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The instant application is directed to the unexpected discovery that a pulsed plasma thruster may be manipulated to produce a jet or plume of exhaust gas suitable for use as a source for dry lubricant. It was discovered that the dimensions and physical arrangement of the various electrodes in relation to, and the composition of the solid fuel may be used to control ablation of the solid such that an amount of the vaporous solid material exiting the pulsed plasma thruster is suitable for use in application of a solid lubricant onto a surface. It was further discovered that by placing a surface proximate to this plume generated by the pulsed plasma thruster, the surface may be lubricated in-situ with an otherwise dry lubricant, which is in direct contrast to both the generally regarded composition of the exhaust produced by a pulsed plasma thruster, the temperatures generated by the plasma, and the cumbersome and extensive techniques utilized to produce surfaces having films of dry lubrication known in the art.

In an embodiment, a lubrication device comprises a solid lubricant disposed between and in contact with a first electrode in electric isolation with a second electrode dimensioned and arranged such that application of an electric potential between the first electrode and the second electrode sufficient to produce an electric arc between the first electrode and the second electrode in an ambient atmosphere at an ambient pressure to produce a plasma ablates at least a portion of the solid lubricant and further vaporizes at least a portion of the solid lubricant to produce a vapor stream comprising the solid lubricant.

In another embodiment, a method comprises disposing a plasma lubricator proximate to a surface in an ambient atmosphere at an ambient pressure, the plasma lubricator comprising a solid lubricant disposed between and in contact with a first electrode and a second electrode; applying an electric potential between the first electrode and the second electrode and optionally activating an igniter to produce an electric arc between the first electrode and the second electrode to produce a plasma in an amount and for a period of time sufficient to ablate at least a portion of the solid lubricant whereby a vapor stream comprising the solid lubricant is produced; and directing the vapor stream onto the surface such that at least a portion of the solid lubricant is deposited onto the surface.

The foregoing has outlined rather broadly the features and technical advantages of the present invention in order that the detailed description that follows may be better understood. Additional features and advantages are described hereinafter which form the subject of the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
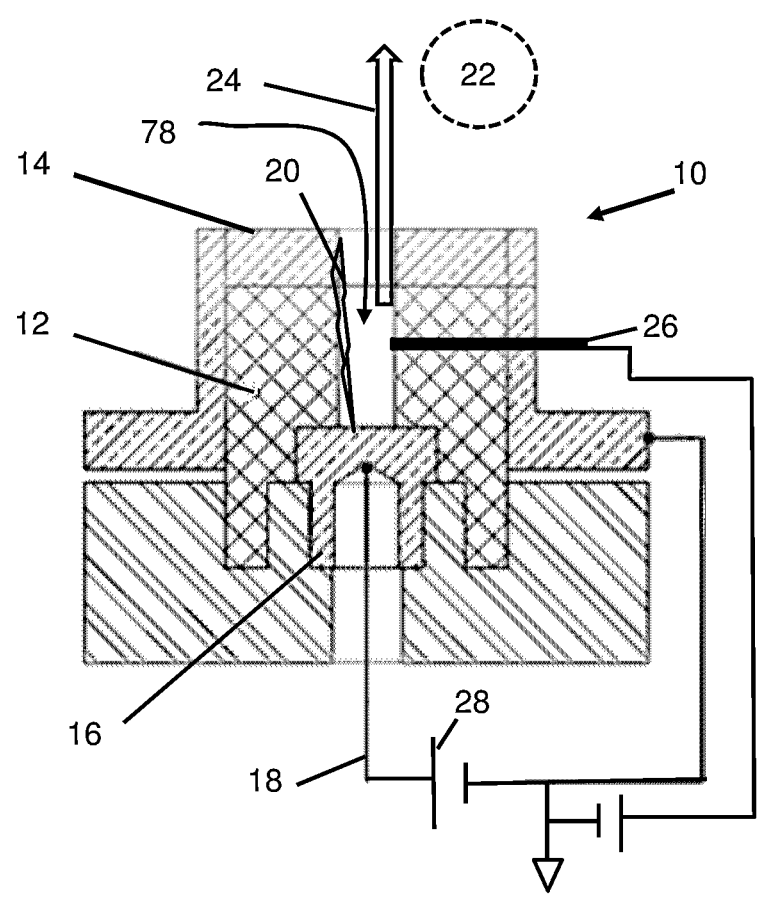
FIG. 1 is a cross-sectional view of a lubrication device according to an embodiment of the disclosure.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the system used/disclosed herein can also comprise some components other than those cited.

The following detailed description is of the best currently contemplated modes of carrying out the subject of the instant disclosure. The description is not to be taken in a limiting sense, but is made merely for the purpose of illustrating the general principles of the disclosure since the scope of the disclosure is best defined by the appended claims.

In the following description, numerous specific details are set forth to provide a thorough understanding of the present invention. However, it will be obvious to those skilled in the art that the present invention may be practiced without such specific details. In other instances, well-known devices have been shown in block diagram form in order not to obscure the subject matter of the instant disclosure in unnecessary detail. For the most part, details unnecessary to obtain a complete understanding of the instant disclosure have been omitted in as much as such details are within the skills of persons of ordinary skill in the relevant art.

For purposes herein and the claims attached hereto, the new numbering scheme for the Periodic Table Groups is used as in Chem. Eng. News, 1985, 63, 27. Therefore, a "Group 4 metal" is an element from Group 4 of the Periodic Table.

For purposes herein, it is to be understood that disclosure directed to an electric arc between two electrodes in an ambient atmosphere at an ambient pressure to produce a plasma between the two electrodes is dependent on both the composition of the ambient atmosphere and the absolute pressure experienced by the device in-situ for a particular application. Accordingly, the spacing, current, voltage, and/or the need for an igniter to produce the spark which subsequently results in formation of the plasma between the two electrodes will vary depending on the ambient pressure and the composition of the ambient atmosphere as is readily apparent to one of skill in the art.

It is to be further understood that the spark and/or the resulting plasma produced by an electrical current flowing between two electrodes is present in an amount sufficient to ablate and/or vaporize at least a portion of the solid lubricant present therein to produce a vapor stream comprising the solid lubricant. It is to be further understood that while a portion of the solid lubricant may be completely dissociated and/or chemically altered, the dimensions and arrangement of the instant pulsed plasma lubrication device or controlled such that at least a portion of the solid lubricant remains in-tact in the vapor stream in a form suitable to provide lubrication to a surface onto which the vapor stream contacts. Attempts are made herein to elucidate the actual mechanism by which the vapor stream comprising the solid lubricant is formed, however, it is not necessary to understand the precise mechanism by which the vapor stream comprising the solid lubricant is produced and the ability to direct this vapor stream comprising the solid lubricant onto a surface under conditions suitable to allow at least a portion of the solid lubricant to adsorb and/or absorb onto the surface.

In addition, it is to be understood that a lubricant may be a liquid under some conditions and a solid under other, more extreme conditions. For purposes herein, a solid lubricant also includes a wet-lubricant which is in solid or semi-solid form under the conditions of use, which requires active heating under a particular set of conditions.

Accordingly, it is further to be understood that the lubrication device is dimensioned, arranged, and powered to produce this vapor stream comprising the solid lubricant in the particular ambient atmosphere under particular ambient conditions in contrast to pulsed plasma thrusters and the like, which ablate and destroy essentially all of the solid propellant to produce a stream of dissociated propellant to generate thrust, which does not provide any lubricity to other surfaces.

In an embodiment, a lubrication device comprises a solid lubricant disposed between and in contact with a first electrode and a second electrode dimensioned and arranged such that application of an electric potential between the first electrode and the second electrode sufficient to produce an electric arc between the first electrode and the second electrode in an ambient atmosphere at an ambient pressure produces a plasma that vaporizes at least a portion of the solid lubricant to produce a vapor stream comprising the solid lubricant. The first electrode being in electric isolation from the second electrode in the absence of a spark or other current flowing from the first electrode to the second electrode across a gap (i.e., a distance) therebetween as described herein.

In an embodiment, the solid lubricant is disposed between and in contact with a planer surface of the first electrode and a parallel planer surface of the second electrode separated by a distance equal to a thickness of the solid lubricant; the first electrode comprises an orifice disposed there through comprising a plurality of sides radially arranged about a central axis and having an average inner diameter of about 20% to about 80% of the thickness of the solid lubricant; the second electrode further having an average outer diameter about the central axis which is larger than the average inner diameter of the orifice; the solid lubricant is radially arranged about the central axis and comprises a hole disposed there-through extending from the first electrode to the second electrode and the hole comprises a plurality of sides radially arranged about the central axis and has an average inner diameter greater than or equal to the average inner diameter of the orifice.

This circular well and ratio of the circumference to the height of the well is crucial to the utility of the instant application. The plurality of sides radially arranged about a central axis having an average inner diameter of about 20% to about 60% of the thickness of the solid lubricant is in direct contrast the ratio require by a pulsed plasma thruster to maximize thrust. It has been discovered that this ratio, by specifically reducing the amount of force produced, results in partial ablation of the solid, thus the ablated solid retains lubrication characteristics previously unknown in the art.

In an embodiment, the first electrode has an annular shape comprising a plurality of sides radially disposed about the central axis having a first outer diameter, the second electrode has an annular shape comprising a plurality of sides radially disposed about the central axis having a second outer diameter which is less than the first outer diameter of the first electrode, and the solid lubricant has an annular shape comprising a plurality of sides radially disposed about the central axis having a third outer diameter which is greater than the second outer diameter of the second electrode and less than or equal to the first outer diameter of the first electrode.

In an embodiment, the first electrode, the second electrode, the average inner diameter of the orifice and/or the distance between the first electrode and the second electrode are arranged and dimensioned such that an electric potential applied between the first and second electrodes [and optionally activating an igniter to produce an electric arc between the first electrode and the second electrode] in the ambient atmosphere under the ambient pressure, produces an electric arc between the first electrode and the second electrode forming an axial currant producing an azimuthal magnetic field along the axial direction producing a radial Lorentz force which radially compresses the electric arc thereby forming a plasma between the first and second electrode while also forming an axial pressure gradient between the second electrode and the orifice, and the ambient atmosphere, and wherein the electric arc between the first electrode and the second electrode further forms a radially diverging current present at the orifice producing an azimuthal magnetic field in a radial direction producing an axial Lorentz force which accelerates the plasma in the axial direction away from the second electrode towards the orifice at a velocity of greater than 1000 m/s; and wherein the solid lubricant absorbs radiation produced by the plasma in an amount sufficient to sublimate a portion of the solid lubricant forming the vapor stream comprising the solid lubricant which is accelerated by the pressure gradient through the orifice at a velocity below about 1000 m/s.

In an embodiment, the second electrode is disposed along a central axis of the lubrication device and the first electrode has a circular cross section perpendicular to the central axis and is concentrically disposed about the first electrode with the solid lubricant uniformly dispersed radially about, between, and in contact with the first electrode and the second electrode.

In an embodiment, the lubrication device according to one or more embodiments comprises a power supply in contact with the first electrode and a second electrode capable of producing the electric arc between the first electrode and the second electrode in the ambient atmosphere at the ambient pressure for a period of time sufficient to vaporize at least a portion of the solid lubricant to produce the vapor stream comprising the solid lubricant. In an embodiment, the power supply may further or optionally include an igniter suitable to initiate the electric arc between the first electrode and the second electrode which is subsequently sustained by the application of a potential across the first and second electrodes.

In an embodiment, the solid lubricant is non-conductive to electricity under the ambient conditions present and/or the solid lubricant comprises a conductive or semi-conductive solid lubricant uniformly and/or anisotropically dispersed in a non-conductive matrix such that the overall solid lubricant is non-conductive to electricity under the ambient conditions present. In an embodiment, the solid lubricant comprises a perfluorinated polyolefin, a polyimide, a polyether, graphite, diamond or a diamond precursor, a metallic metal, a metallic metal alloy, a metal carbide, a metal oxide, a metal hydroxide, a metal sulfide, a metal sulfate, a metal nitride, a metal nitrate, a metal fluoride, a metal chloride, a metal bromide, a metal iodide, a metal silicate, a clay, a mineral, or a combination thereof, wherein the metal is selected from Groups 1 to 15 of the periodic table of the elements. In an embodiment, the solid lubricant is non-conductive or is rendered non-conductive by dispersing one or more solid lubricants in a polymeric or otherwise non-conductive matrix. In an embodiment, one or more solid lubricants are uniformly or anisotropically dispersed in a polymeric matrix comprising one or more polymers selected from the group consisting of $C_2$-$C_{20}$ polyolefins, $C_2$-$C_{20}$ polyamides, $C_2$-$C_{20}$ polyesters, $C_2$-$C_{20}$ polyimides, $C_2$-$C_{20}$ polyethers, which may be halogenated and/or substituted including halogenated $C_2$-$C_{20}$ polyolefins, halogenated $C_2$-$C_{20}$ polyamides, halogenated $C_2$-$C_{20}$ polyesters, halogenated $C_2$-$C_{20}$ polyethers, and any combination thereof. In an embodiment, one or more components of the polymeric matrix may also act or function as solid lubricant.

In an embodiment, the solid lubricant comprises graphite, diamond, a diamond precursor, polytetrafluoroethylene, a polyimide comprising pyromellitic dianhydride and 4,4' diamine diphenyl ether, polyoxymethylene, boron nitride, molybdenum disulfide, tungsten disulfide, mica, copper sulfate, silver sulfate, gold sulfate, cadmium iodide, lead iodide, a fluorinated polyolefin, copper, silver, gold, nickel, lead, tin, indium, white lead, lime, talc, bentonite, or a combination thereof.

In an embodiment, the solid lubricant comprises one or more solid lubricants evenly or uniformly dispersed in a polymeric matrix. In an embodiment, the solid lubricant comprises one or more solid lubricants anisotropically dispersed in a polymeric matrix. For example, the solid lubricant may comprise a plurality of concentric shells which differ one from the other such that ablation of the solid lubricant produces a vapor stream comprising the solid lubricant which changes in composition over time.

In an embodiment, the ambient pressure is greater than or equal to about 5 torr. In an embodiment, the ambient pressure is greater than or equal to about 10 torr, or greater than or equal to about 100 torr, or greater than or equal to about 760 torr. Accordingly, the lubrication device may be dimensioned and arranged to function at atmospheric pressure on Earth, as well as at ambient conditions in deep space or anywhere in-between.

Turning to the Figures, FIG. 1 shows a cross section of a lubrication device according to an embodiment of the present disclosure. The lubrication device generally referred to as 10 comprises a solid lubricant 12 disposed between and in contact with a first electrode 14 and a second electrode 16 dimensioned and arranged such that application of an electric potential 18, which may be produced by a power supply 28, between the first electrode 14 and the second electrode 16 sufficient to produce an electric arc 20 between the first electrode 14 and the second electrode 16 in an ambient atmosphere at an ambient pressure, generally referred to as 22, produces a plasma 78 which ablates and vaporizes at least a portion of the solid lubricant 12 to produce a vapor stream 24 comprising a portion of the solid lubricant 12 at least partially in-tact or in a form which provides lubricity.

In an embodiment, the lubrication device 10 may further include an igniter 26 to initiate the electric arc 20, depending on the ambient atmosphere and ambient pressure 22. The igniter 26 is shown protruding through the solid lubricant 12, but may also be located proximate to or integral with the first electrode 14 and/or the second electrode 16 (See FIG. 2).

Figure 2:
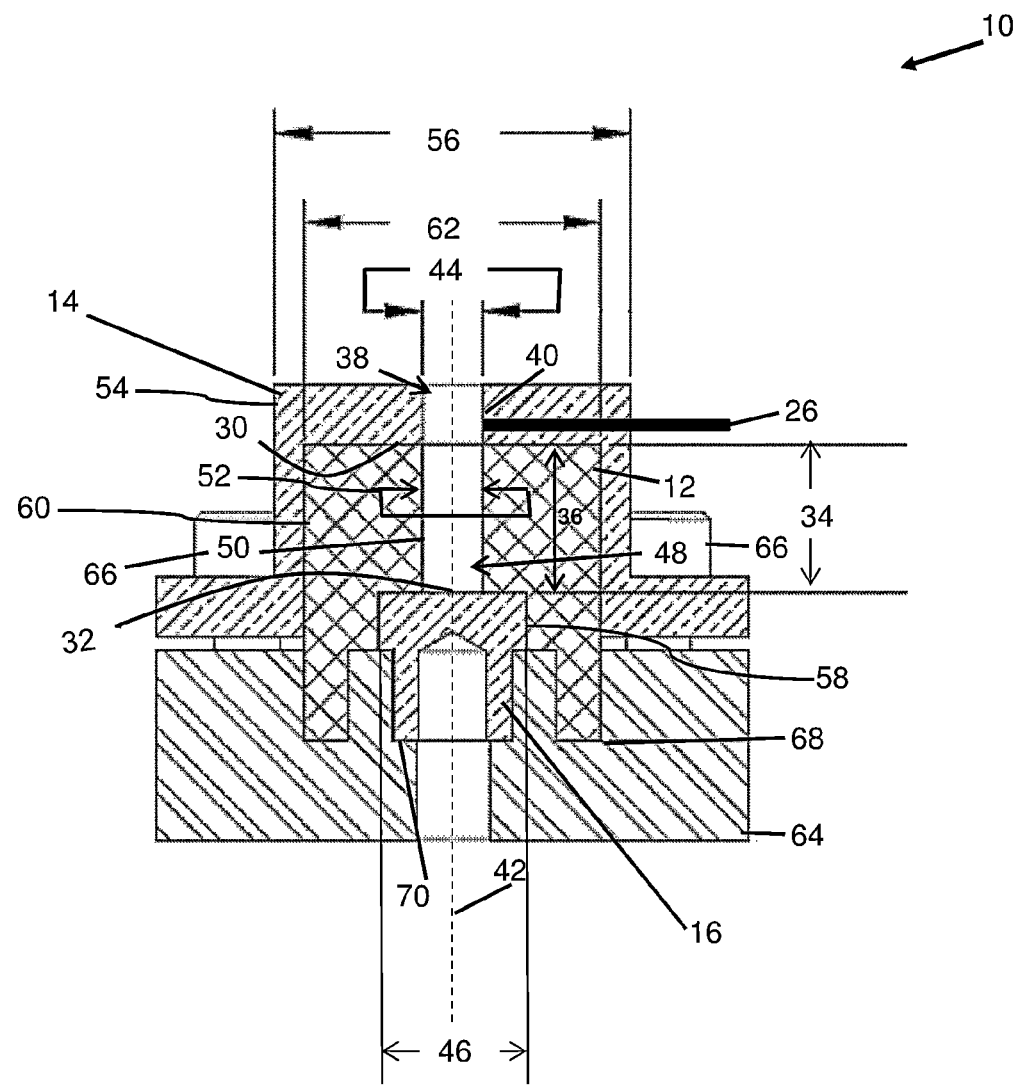
FIG. 2 is a cross-sectional view of a lubrication device according to an embodiment of the disclosure.

As shown in FIG. 2, in an embodiment, the lubrication device 10 includes the solid lubricant 12 disposed between and in contact with a planer surface 30 of the first electrode 14 and a parallel planer surface 32 of the second electrode 16 separated by a distance 34 equal to a thickness 36 of the solid lubricant 12 in contact with both the first electrode 14 and the second electrode 16. In an embodiment, the first electrode 14 comprises an orifice 38 disposed there through comprising a plurality of sides 40 radially arranged about a central axis 42. In an embodiment, the average inner diameter 44 of the orifice 38 is about 20% to about 60% of the distance 34 between the first electrode 14 and the second electrode 16. In an embodiment, the average inner diameter 44 of the orifice 38 is about 25%, or about 30% or about 35% or about 40%, or about 45%, or about 50%, or about 55% of the distance 34 between the first electrode 14 and the second electrode 16.

In an embodiment, a portion of the second electrode 16 has an average outer diameter 46 about the central axis 42 which is larger than the average inner diameter 44 of the orifice 38. In an embodiment, the solid lubricant 12 is radially arranged about the central axis 42 and comprises a hole 48 disposed there through extending from the first electrode 14 to the second electrode 16, the hole comprising a plurality of sides 50 radially arranged about the central axis 42 and having an average inner diameter 52 greater than or equal to the average inner diameter 44 of the orifice 38.

In an embodiment, the first electrode 14 comprises a generally annular shape comprising a plurality of sides 54 radially disposed about the central axis 42 having an average first outer diameter 56, and the second electrode 16 comprises a generally annular shape comprising a plurality of sides 58 radially disposed about the central axis 42 having an average second outer diameter 46 which is less than the first outer diameter 56, and the solid lubricant 12 comprises a generally annular shape composing a plurality of sides 60 radially disposed about the central axis 42 having a third outer diameter 62 which is greater than the second outer diameter 46 and less than or equal to the first outer diameter 56. In an embodiment, the sides 54 of first electrode 14 form a well in which the solid lubricant 12 is secured.

In an embodiment, the first electrode 14 and the second electrode 16 may be attached or otherwise engaged with a non-conductive base 64. As is shown in FIG. 2, the first electrode 14 is secured to the base 64 via a plurality of threaded members 66, and the solid lubricant 12 is dimensioned and arranged to fit within a groove 68 disposed within the base 64. Attachment of the first electrode 14 to the base 64 frictionally engages the second electrode 16 in a corresponding groove 70 also located in the base 64

Figure 3:
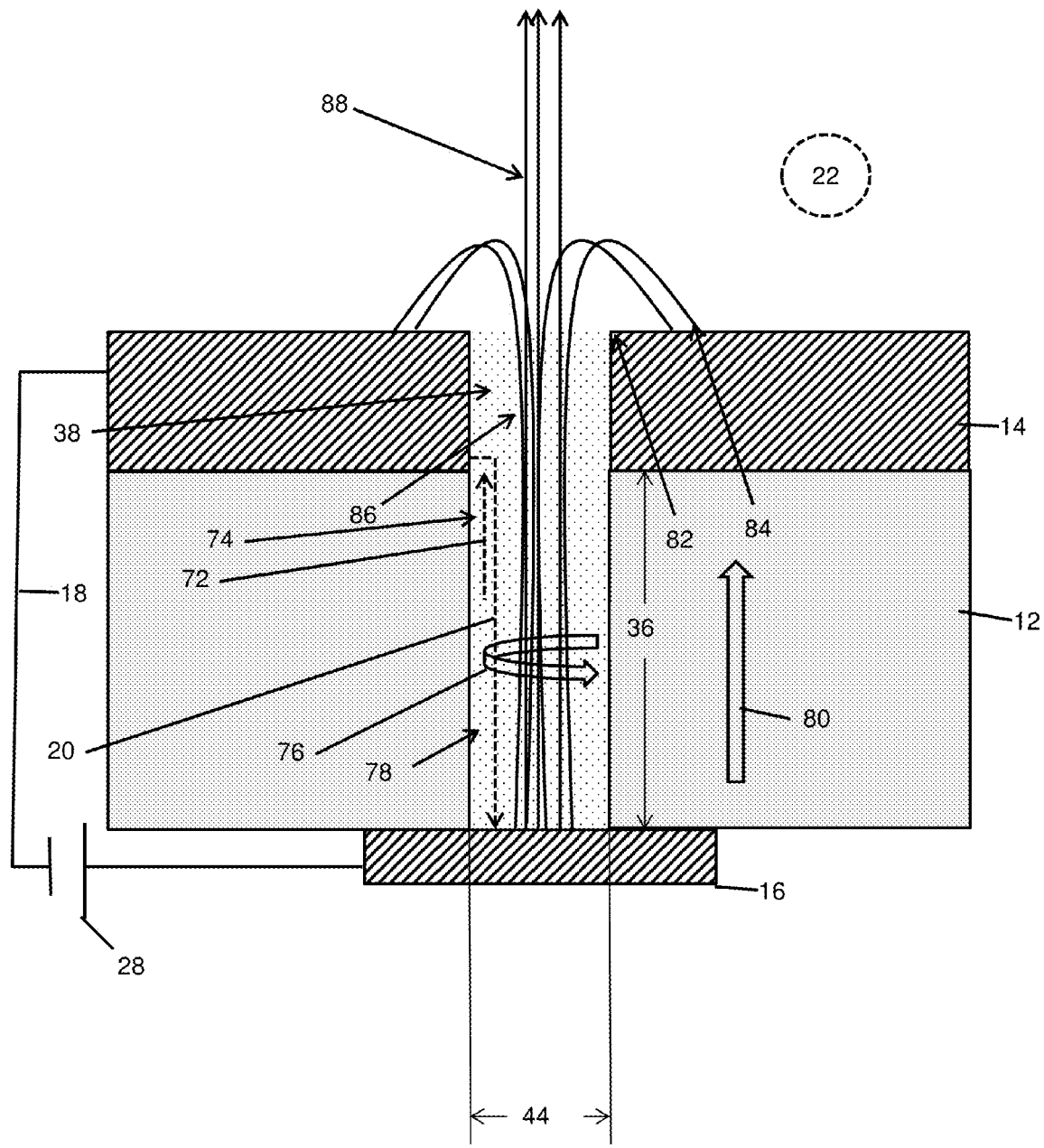
FIG. 3 is a cross-sectional view showing current contour lines and velocity vectors of the vapor stream comprising the solid lubricant produced by a lubrication device according to an embodiment of the disclosure.

As shown in FIG. 3, in an embodiment, the first electrode 14, the second electrode 16, the average inner diameter 44 of the orifice 38 and/or the distance 36 between the first electrode 14 and the second electrode 16 are arranged and dimensioned such that an electric potential 18 applied between the first electrode 14 and the second electrode 16 produces an electric arc 20 (See FIG. 2) between the first electrode 14 and the second electrode 16 in the ambient atmosphere under the ambient pressure 22 ablating at least a portion of the solid lubricant 12, wherein the electric arc 20 forms an axial current 72 producing an azimuthal magnetic field along, in, or having an axial direction 74 producing a radial Lorentz force 76 which radially compresses the electric arc forming a plasma 78 between the first electrode 14 and the second electrode 16 and also forming an axial pressure gradient 80 between the second electrode 16 and the orifice 38 within the well 15 bound by the solid lubricant 12, the second electrode 16, and a portion of the first electrode 14, which is open to and in fluid communication with the ambient atmosphere 22 through the orifice 38. The electric arc 20 and/or the current flow resulting therefrom, further forms a radially diverging current 82 present at the orifice 38 which produces an azimuthal magnetic field along, in or having a radial direction 84 producing an axial Lorentz force 86 which accelerates the plasma 78 in the axial direction away from the second electrode 16 towards the orifice 38 at a velocity of greater than 1000 m/s; also wherein the solid lubricant 12 disposed at one of the sides 50 of the hole or opening 48 in the solid lubricant present at one or more of the plurality of sides 50 of the hole 48 disposed through the solid lubricant 12 extending from the first electrode 14 to the second electrode 16 absorbs radiation (heat) produced by the electric arc 20 and/or the plasma 78 in an amount sufficient to sublimate a portion of the solid lubricant 12 forming the vapor stream 88 comprising at least a portion of the solid lubricant 12 in-tact, or at least a portion of any lubricant precursors present in the solid lubricant which upon sublimation form compounds having lubricity, which is accelerated by the pressure gradient 80 through the orifice 38 and beyond at a velocity below about 1000 m/s. Accordingly, the average inner diameter 52 of hole 48 increases as the solid lubricant is ablated. In an embodiment, the vapor stream 88 comprising the solid lubricant 12 is accelerated by the pressure gradient 80 through the orifice 38 and beyond at a velocity below about 900 m/s, or below about 800 m/s, or below about 700 m/s, or below about 600 m/s, or below about 500 m/s, or below about 400 m/s, or below about 300 m/s, or below about 200 m/s, and above about 1 m/s, or above about 5 m/s, or above about 10 m/s.

Figure 4:
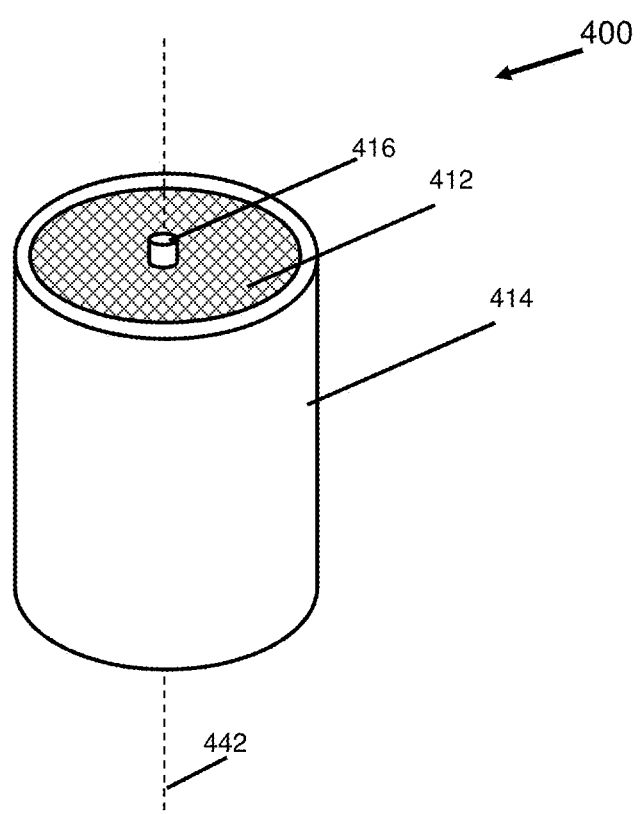
FIG. 4 is a perspective view of a lubrication device according to an alternative embodiment of the instant disclosure.
Figure 5:
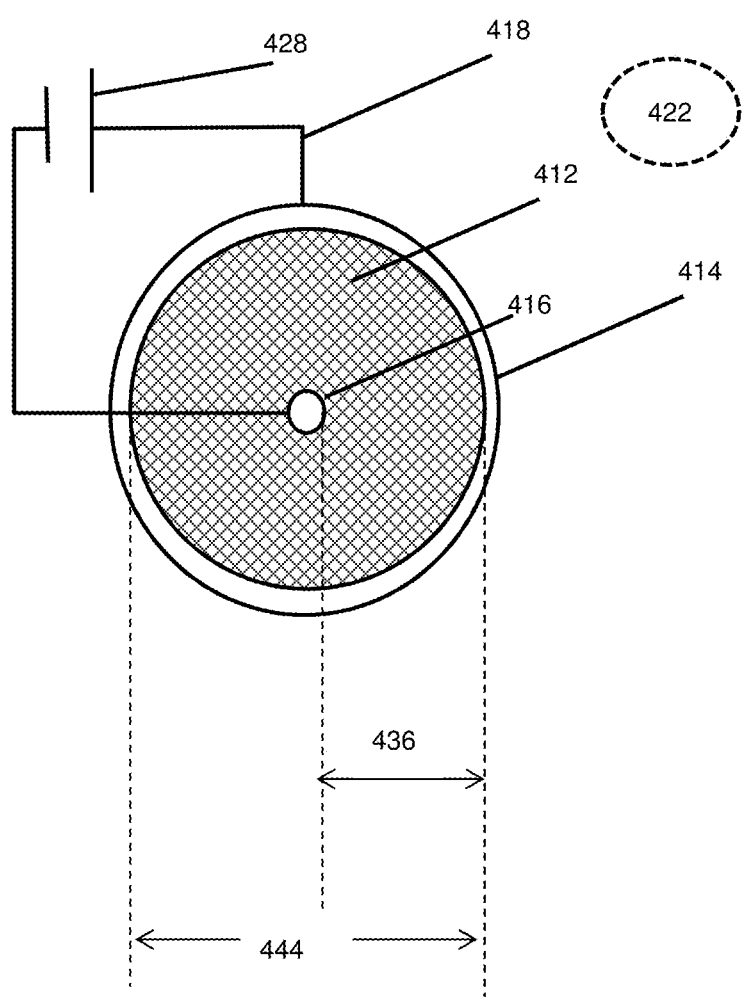
FIG. 5 is a top view of a lubrication device according to an alternative embodiment of the instant disclosure.
Figure 6:
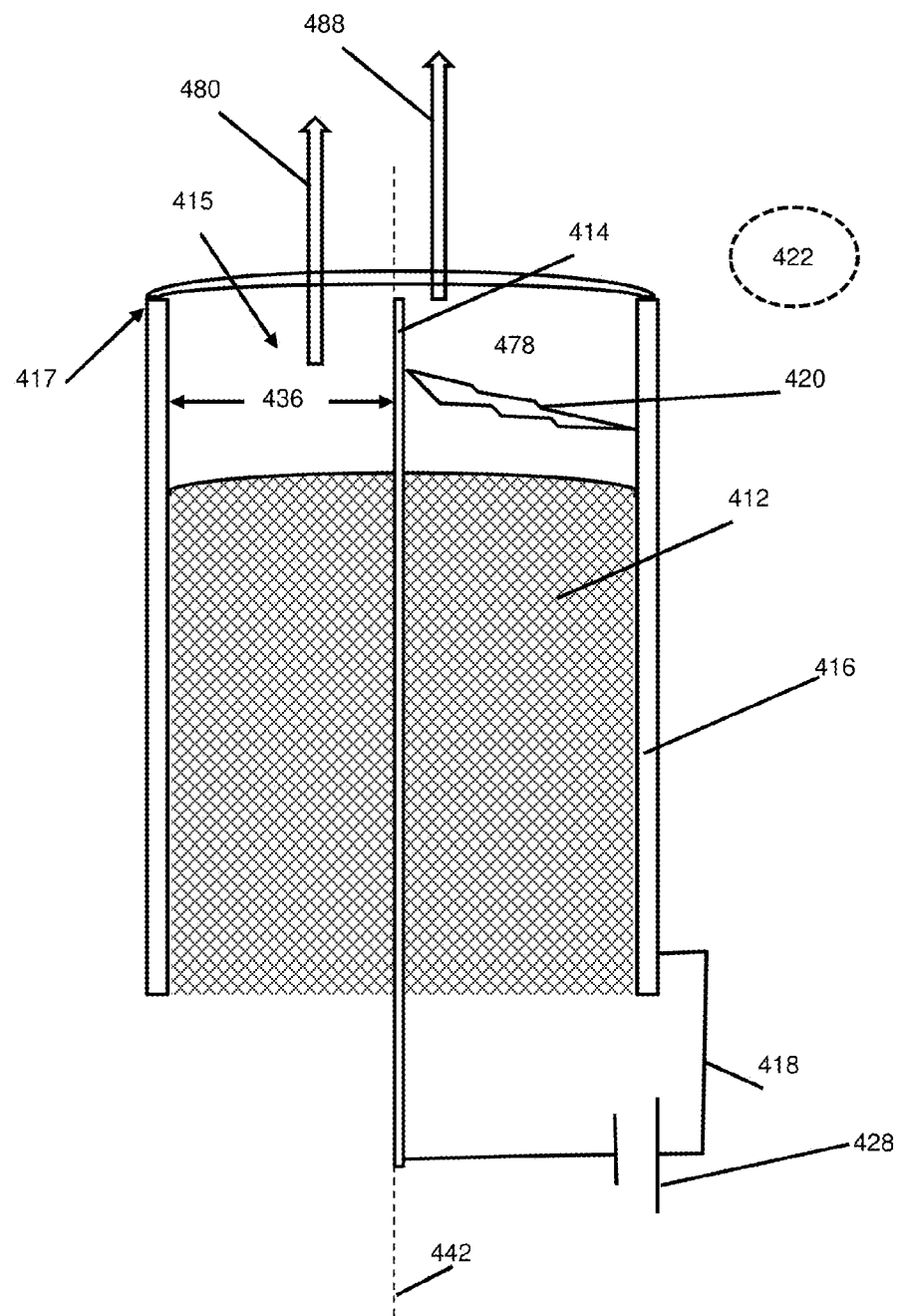
FIG. 6 is a cross-sectional view of a lubrication device according to an alternative embodiment of the instant disclosure.

As shown in FIGS. 4, 5, and 6, in an alternative embodiment, the lubrication device 400 comprises a second electrode 416 disposed along a central axis 442, and a first electrode 414 having a circular cross section perpendicular to the central axis 442 (See FIG. 5) which is concentrically disposed about the second electrode 416 and a solid lubricant 412, uniformly dispersed between and in contact with the first electrode 414 and the second electrode 416.

In an embodiment, the first electrode 414, the second electrode 416, the average inner diameter 444 of the first electrode 414 and/or the distance 436 between the first electrode 414 and the second electrode 416 are arranged and dimensioned such that an electric potential 418 applied between the first electrode 414 and the second electrode 416 by a power supply 428 produces an electric arc 420 between the first electrode 414 and the second electrode 416 in the ambient atmosphere under the ambient pressure 422 (See FIG. 6) to produce a plasma 478 ablating at least a portion of the solid lubricant 412 to produce a well 415 bound on the sides by the second electrode 416 and on the bottom by the solid lubricant 412 forming a pressure gradient 480 between the well 415 and the ambient atmosphere 422.

The electric arc 420 also forms a plasma 478 between the first electrode 414 and the second electrode 416 in the well 415 such that the solid lubricant 412 absorbs radiation (heat) produced by the plasma 478 in an amount sufficient to sublimate a portion of the solid lubricant 412 forming a vapor stream 488 comprising the solid lubricant 412 which is accelerated by a pressure gradient 480 through a top portion of the electrode 417 and beyond at a velocity below about 1000 m/s. In an embodiment, the vapor stream 488 comprising the solid lubricant 412 is accelerated by the pressure gradient 480 through the top portion of the electrode 417 and beyond at a velocity below about 900 m/s, or below about 800 m/s, or below about 700 m/s, or below about 600 m/s, or below about 500 m/s, or below about 400 m/s, or below about 300 m/s, or below about 200 m/s, and above about 1 m/s or above about 10 m/s.

In an embodiment, the first electrode, the second electrode, or both according to any one or more embodiments are formed from a metal, including stainless steel, copper, gold, aluminum, titanium, platinum, and the like. In an embodiment, the entire lubrication device has a mass less than 1 kg, or less than 100 g, or less than 20 g, or less than 10 g, or less than 5 g, or less than 1 g.

In an embodiment, the lubrication device is equipped to provide lubrication of a surface for greater than 100 days, or greater than 200 days, or greater than 10 years.

In an embodiment, the electric potential applied between the electrodes is poised to produce a discharge potential suitable for use under a particular set of conditions, followed by a resting time when no potential is applied between the electrodes. In an embodiment, the electric potential is pulsed on to produce vapor stream comprising the solid lubricant for a period of time from about 0.001 seconds or greater. In an embodiment, the electric potential is pulsed on to produce vapor stream comprising the solid lubricant for a period of time of greater than or equal to about 0.01 seconds, or greater than or equal to about 0.1 seconds, or greater than or equal to about 1 second, depending on the requirements of the particular system.

In an embodiment, the electric potential applied between the two electrodes is greater than or equal to the minimum breakdown voltage of the ambient atmosphere at the ambient pressure. In an embodiment, the electric potential applied between the two electrodes is greater than or equal to about 90%, or greater than or equal to about 100%, or greater than or equal to about 150%, or greater than or equal to 200% of the minimum breakdown voltage of the ambient atmosphere at the ambient pressure.

In an embodiment, an igniter may be employed to produce the initial spark between the electrodes which subsequently produces the plasma to produce the vapor stream comprising the solid lubricant. Suitable igniters include spark-plugs, spark-gaps, piezoelectric igniters, and/or the like which are located in proximity to the first electrode, the second electrode, or therebetween.

In an embodiment, the lubrication device provides in-situ lubrication operating on less than or equal to about 10 watts, or less than or equal to about 5 watts, or less than or equal to about 2 watts, or less than or equal to about 1 watt of power to produce the vapor steam comprising the solid lubricant.

In an embodiment, the outer diameter of the largest electrode (the first or the second electrode) is less than or equal to about 10 cm, or less than or equal to about 5 cm, or less than or equal to about 3 cm, or less than or equal to about 1 cm, or less than or equal to about 0.5 cm.

In an embodiment, the first electrode comprises a plurality of electrodes; the second electrode comprises a plurality of electrodes, or a combination thereof.

In an embodiment, a method comprises disposing a plasma lubricator comprising a solid lubricant disposed between and in contact with a first electrode and a second electrode according to one or more embodiments disclosed herein proximate to a surface in an ambient atmosphere at an ambient pressure and applying an electric potential between the first electrode and the second electrode and optionally activating an igniter to produce an electric arc between the first electrode and the second electrode for an amount of time sufficient to produce a plasma to produce a vapor stream comprising the solid lubricant; and directing the vapor stream comprising the solid lubricant onto the surface such that at least a portion of the solid lubricant is deposited (i.e., absorbed, adsorbed, and/or the like) onto the surface.

In an embodiment, the lubrication device is operated to produce a vapor stream comprising the solid lubricant for a period of time less than or equal to about 1 hour in an operation cycle of a surface lasting 8 hours or more. In an embodiment, the lubrication device is operated to produce a vapor stream comprising the solid lubricant for a period of time less than or equal to about 30 minutes, or less than or equal to about 10 minutes, or less than or equal to about 3 minutes, or less than or equal to about 1 minute to lubricate a surface in an operation cycle of a surface lasting 8 hours or more.

In an embodiment, the vapor stream comprising the solid lubricant exits the lubrication device and contacts the surface at a velocity below about 1000 m/s, or below about 900 m/s, or below about 500 m/s, or below about 100 m/s, or below about 10 m/s, or below about 1 m/s, or below about 0.1 m/s and above about 0.1 m/s, or above about 1 m/s, or above about 10 m/s.

In an embodiment, the plasma lubricator is disposed proximate to the surface to be lubricated in-situ, that is, under normal operational conditions, at a distance from about 0.1 mm to about 50 cm as determined from the closest electrode to the closest surface requiring lubrication. In an embodiment, the electric potential is applied as a plurality of pulses for one or more durations depending on the lubrication needs of a particular surface, the composition of the solid lubricant and the like.

In an embodiment, the lubrication provided by one or more embodiments of the lubrication device disclosed herein provides a reduction of wear of a surface over a surface lifetime which is at least 10%, or 20%, or 30%, or 50%, or 100% improved over a similar surface operated under similar conditions in which the same lubricant was pre-applied to the surface using methods known to one of skill in the art.

Embodiments

The following embodiments are disclosed herein.

1. A lubrication device comprising:
    a solid lubricant disposed between and in contact with a first electrode and a second electrode dimensioned and arranged such that application of an electric potential between the first electrode and the second electrode sufficient to produce an electric arc between the first electrode and the second electrode in an ambient atmosphere at an ambient pressure produces a plasma that vaporizes at least a portion of the solid lubricant to produce a vapor stream comprising the solid lubricant.
2. The lubrication device according to embodiment 1, wherein the solid lubricant is disposed between and in contact with a planer surface of the first electrode and a parallel planer surface of the second electrode separated by a distance equal to a thickness of the solid lubricant;
    the first electrode comprising an orifice disposed there through comprising a plurality of sides radially arranged about a central axis and having an average inner diameter of about 20% to about 60% of the thickness of the solid lubricant;
    the second electrode having an average outer diameter about the central axis which is larger than the average inner diameter of the orifice;
    the solid lubricant radially arranged about the central axis and comprising a hole disposed there through from the first electrode to the second electrode, the hole comprising a plurality of sides radially arranged about the central axis and having an average inner diameter greater than or equal to the average inner diameter of the orifice.
3. The lubrication device according to embodiment 1 or 2, wherein the first electrode comprises a plurality of sides radially disposed about the central axis having a first outer diameter,
    the second electrode comprising a plurality of sides radially disposed about the central axis having a second outer diameter which is less than the first outer diameter,
    the solid lubricant comprising a plurality of sides radially disposed about the central axis having a third outer diameter which is greater than the second outer diameter and less than or equal to the first outer diameter.
4. The lubrication device according to any one of embodiments 1 through 3, wherein the first electrode, the second electrode, the average inner diameter of the orifice and the distance between the first electrode and the second electrode are arranged and dimensioned such that an electric potential applied between the first and second electrodes produces an electric arc between the first electrode and the second electrode in the ambient atmosphere under the ambient pressure;
    wherein the electric arc forms an axial current producing an azimuthal magnetic field along the axial direction producing a radial Lorentz force which radially compresses the electric arc forming a plasma between the first and second electrode and forming an axial pressure gradient between the second electrode and the orifice;
    wherein the electric arc further forms a radially diverging current present at the orifice producing an azimuthal magnetic field in a radial direction producing an axial Lorentz force which accelerates the plasma in the axial direction away from the second electrode towards the orifice at a velocity of greater than 1000 m/s; and
    wherein the solid lubricant absorbs radiation produced by the plasma in an amount sufficient to sublimate a portion of the solid lubricant forming the vapor stream composing the solid lubricant which is accelerated by the pressure gradient through the orifice at a velocity below about 1000 m/s.
5. The lubrication device according to any one of embodiments 1 through 4, wherein the second electrode is disposed along the central axis, the first electrode having a circular cross section perpendicular to the central axis is concentrically disposed about the first electrode and the solid lubricant is uniformly dispersed between and in contact with the first electrode and the second electrode.
6. The lubrication device according to any one of embodiments 1 through 5, further comprising a power supply in contact with the first electrode and the second electrode capable of producing the electric arc between the first electrode and the second electrode to produce a plasma in the ambient atmosphere at the ambient pressure for a period of time sufficient to vaporize at least a portion of the solid lubricant to produce the vapor stream comprising the solid lubricant, and optionally an igniter suitable to initiate the electric arc between the first electrode and the second electrode.
7. The lubrication device according to any one of embodiments 1 through 6, wherein the solid lubricant comprises a perfluorinated polyolefin, a polyimide, a polyether, graphite, diamond, a metallic metal, a metallic metal alloy, a metal carbide, a metal oxide, a metal hydroxide, a metal sulfide, a metal sulfate, a metal nitride, a metal nitrate, a metal fluoride, a metal chloride, a metal bromide, a metal iodide, a metal silicate, a clay, a mineral, or a combination thereof, wherein the metal is selected from Groups 1 to 15 of the periodic table of the elements.
8. The lubrication device according to any one of embodiments 1 through 7, wherein the solid lubricant comprises one or more solid lubricants dispersed in a polymeric matrix selected from the group consisting of $C_2$-$C_{20}$ polyolefins, $C_2$-$C_{20}$ polyamides, $C_2$-$C_{20}$ polyesters, $C_2$-$C_{20}$ polyimides, halogenated $C_2$-$C_{20}$ polyolefins, halogenated $C_2$-$C_{20}$ polyamides, halogenated $C_2$-$C_{20}$ polyesters, and combinations thereof.
9. The lubrication device according to any one of embodiments 1 through 8, wherein the solid lubricant comprises graphite, diamond, polytetrafluoroethylene, a polyimide comprising pyromellitic dianhydride and 4,4' diamine diphenyl ether, polyoxymethylene, boron nitride, molybdenum disulfide, tungsten disulfide, mica, copper sulfate, silver sulfate, gold sulfate, cadmium iodide, lead iodide, a fluorinated polyolefin, copper, silver, gold, nickel, lead, tin, indium, white lead, lime, talc, bentonite, or a combination thereof.
10. The lubrication device according to any one of embodiments 1 through 9, wherein the ambient pressure is greater than or equal to about 5 torr.
11. A method comprising:
    disposing a plasma lubricator according to any one of embodiments 1-10 proximate to a surface in an ambient atmosphere at an ambient pressure, the plasma lubricator comprising a solid lubricant disposed between and in contact with a first electrode and a second electrode;

applying an electric potential between the first electrode and the second electrode and optionally activating an igniter to produce an electric arc between the first electrode and the second electrode to produce a plasma for an amount of time sufficient to produce a vapor stream comprising the solid lubricant; and directing the vapor stream onto the surface such that at least a portion of the solid lubricant is deposited onto the surface.

12. The method according to embodiment 11, wherein the plasma lubricator composes the solid lubricant disposed between and in contact with a planer surface of the first electrode and a parallel planer surface of the second electrode separated by a distance equal to a thickness of the solid lubricant;

the first electrode comprising an orifice disposed there through comprising a plurality of sides radially arranged about a central axis and having an average inner diameter of about 20% to about 60% of the thickness of the solid lubricant;

the second electrode having an average outer diameter about the central axis which is larger than the average inner diameter of the orifice;

the solid lubricant radially arranged about the central axis and comprising a hole disposed there through from the first electrode to the second electrode, the hole comprising a plurality of sides radially arranged about the central axis and having an average inner diameter greater than or equal to the average inner diameter of the orifice.

13. The method according to embodiments 11 or 12, wherein the first electrode comprises a plurality of sides radially disposed about the central axis having a first outer diameter, the second electrode comprising a plurality of sides radially disposed about the central axis having a second outer diameter which is less than the first outer diameter, the solid lubricant comprising a plurality of sides radially disposed about the central axis having a third outer diameter which is greater than the second outer diameter and less than or equal to the first outer diameter.

14. The method according to any one of embodiments 11 through 13, wherein the first electrode, the second electrode, the average inner diameter of the orifice and the distance between the first electrode and the second electrode are arranged and dimensioned such that the electric potential applied between the first and second electrodes produces an electric arc between the first electrode and the second electrode in the ambient atmosphere under the ambient pressure;

wherein the electric arc forms an axial current producing an azimuthal magnetic field along the axial direction producing a radial Lorentz force which radially compresses the electric arc forming a plasma between the first and second electrode and forming an axial pressure gradient between the second electrode and the orifice;

wherein the electric arc further forms a radially diverging current present at the orifice producing an azimuthal magnetic field in a radial direction producing an axial Lorentz force which accelerates the plasma in the axial direction away from the second electrode towards the orifice at a velocity of greater than 1000 m/s; and wherein the solid lubricant absorbs radiation produced by the plasma in an amount sufficient to sublimate a portion of the solid lubricant forming the vapor stream comprising the solid lubricant which is accelerated by the pressure gradient through the orifice at a velocity below about 1000 m/s.

15. The method according to any one of embodiments 11 through 14, wherein the vapor stream comprising the solid lubricant is accelerated by the pressure gradient through the orifice at a velocity below about 500 m/s and above about 1 m/s.

16. The method according to any one of embodiments 11 through 15, wherein the second electrode is disposed along a central axis, the first electrode having a circular cross section perpendicular to the central axis is concentrically disposed about the first electrode and the solid lubricant is uniformly dispersed between and in contact with the first electrode and the second electrode.

17. The method according to any one of embodiments 11 through 16, wherein the solid lubricant comprises a perfluorinated polyolefin, a polyimide, a polyether, graphite, diamond, a metallic metal, a metallic metal alloy, a metal carbide, a metal oxide, a metal hydroxide, a metal sulfide, a metal sulfate, a metal nitride, a metal nitrate, a metal fluoride, a metal chloride, a metal bromide, a metal iodide, a metal silicate, a clay, a mineral, or a combination thereof, wherein the metal is selected from Groups 1 to 15 of the periodic table of the elements.

18. The method according to any one of embodiments 11 through 17, wherein the solid lubricant composes graphite, diamond, polytetrafluoroethylene, a polyimide comprising pyromellitic dianhydride and 4,4' diamine diphenyl ether, polyoxymethylene, boron nitride, molybdenum disulfide, tungsten disulfide, mica, copper sulfate, silver sulfate, gold sulfate, cadmium iodide, lead iodide, a fluorinated polyolefin, copper, silver, gold, nickel, lead, fin, indium, white lead, lime, talc, bentonite, or a combination thereof.

19. The method according to any one of embodiments 11 through 18, wherein the solid lubricant comprises one or more solid lubricants dispersed in a polymeric matrix selected from the group consisting of $C_2$-$C_{20}$ polyolefins, $C_2$-$C_{20}$ polyamides, $C_2$-$C_{20}$ polyesters, $C_2$-$C_{20}$ polyimides, halogenated $C_2$-$C_{20}$ polyolefins, halogenated $C_2$-$C_{20}$ polyamides, halogenated $C_2$-$C_{20}$ polyesters, and combinations thereof.

EXAMPLES

Figure 7:
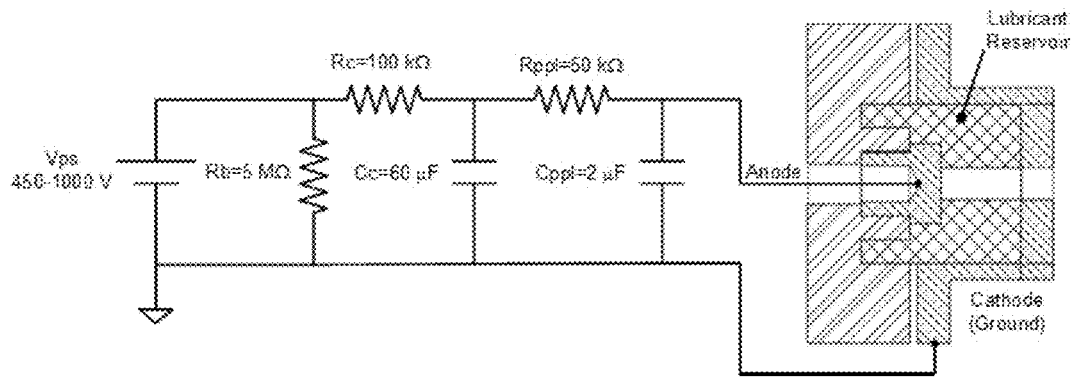
FIG. 7 is a schematic drawing showing a lubrication device and a power supply according to an embodiment of the instant disclosure.
Figure 8:
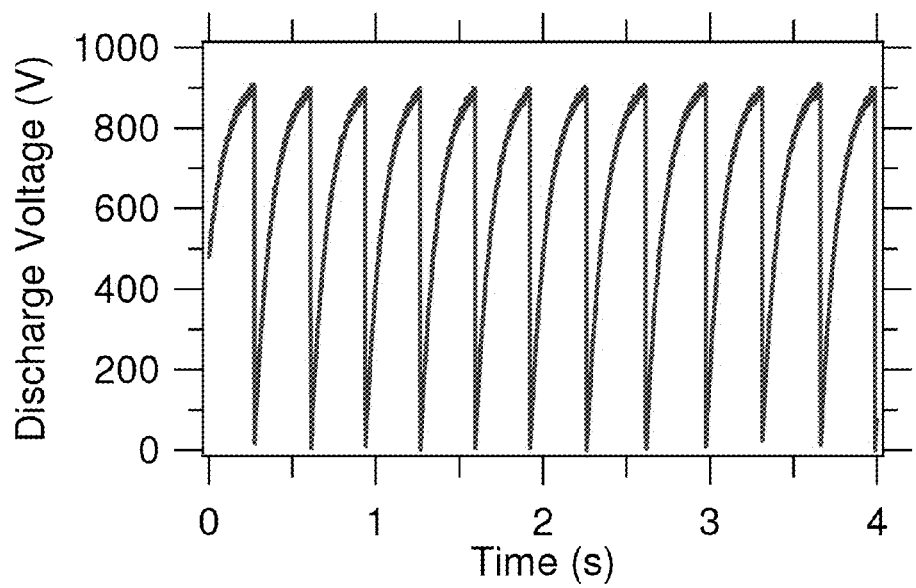
FIG. 8 is a graphical representation of the discharge voltage over time of the embodiment shown in FIG. 7.

To demonstrate the utility of embodiments disclosed herein the following examples are presented in which a practical system for replenishing dry lubricants in-situ using plasma deposition technology as a replacement for dry lubricants with low wear resistance or wet lubricants requiring active heating in extreme environments is shown. FIG. 7 shows a pulsed plasma lubrication device suitable for use in conditions typical of the Martian atmosphere. A triggerless firing circuit was employed with a lubrication device according to embodiments disclosed herein which exploits the breakdown characteristics of the 5 torr Martian atmosphere, comprising 95% $CO_2$, and having a minimum breakdown voltage of about 460V at about 0.5 mmHg*cm using a 1 mm gap between the first electrode and the second electrode. The lubrication device was operated in a pulsed mode as shown in FIG. 8.

Figure 9:
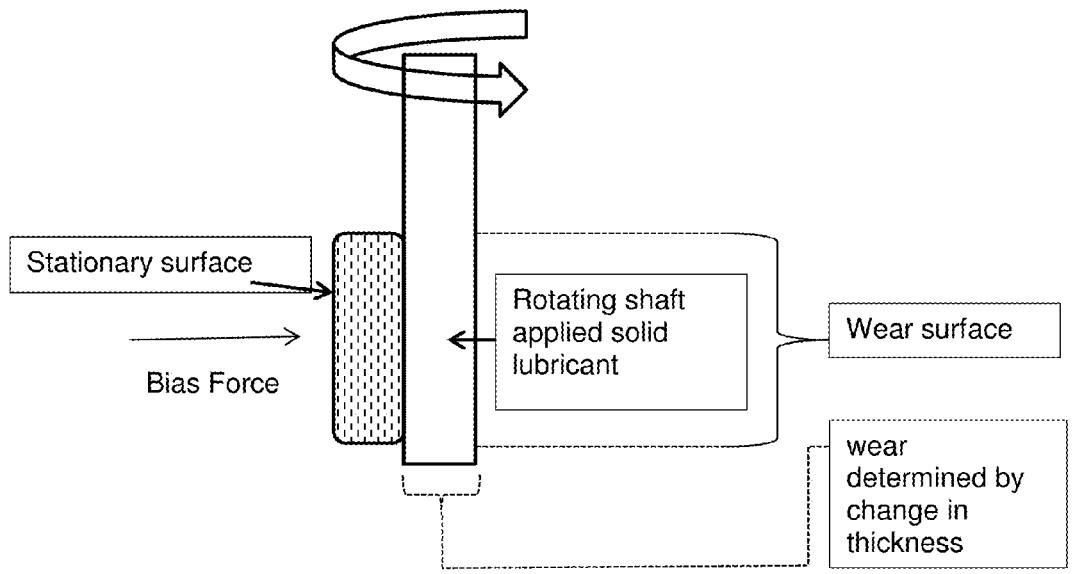
FIG. 9 is a block diagram showing a testing device used to evaluate embodiments of lubrication devices disclosed herein.
Figure 10:
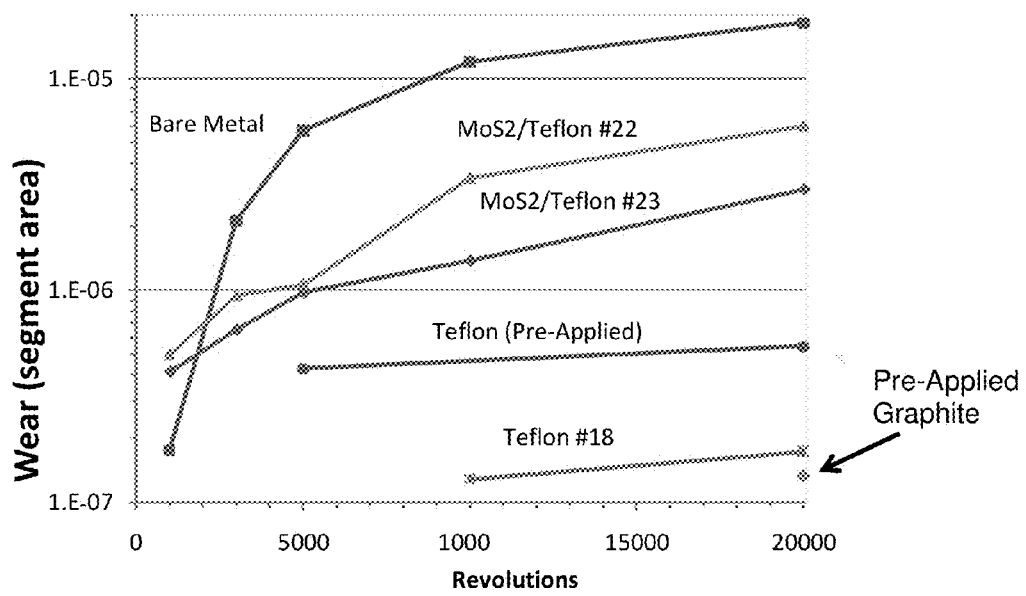
FIG. 10 is a graphical representation showing wear of inventive and comparative embodiments obtained using the testing device of FIG. 9.

To evaluate wear resistance, an frictional biased evaluation device was constructed as shown in FIG. 9 wherein a stainless steel surface was rotated in frictional contact with a stationary stainless steel surface biased against the rotating surface at a force of 1.5 lbs for a period of time using different lubricants applied to the rotating device in an atmosphere and under ambient conditions similar to those on Mars, and then removed from this atmosphere and tested under ambient conditions in the lab. The wear on the rotating shaft was then measured after a period of time. The data are shown in FIG. 10. The bare metal, pre-applied perfluorinated ethylene, and pre-applied graphite examples represent comparative examples. The pulsed plasma lubricator was positioned proximate to the rotting shaft in a chamber at about 5 torr in a $CO_2$ atmosphere similar to the conditions found on Mars, and pulsed a plurality of times over a few minutes to simulate in-situ lubrication using perfluorinated ethylene and molybdenum disulfide dispersed in a perfluorinated ethylene matrix. The lubricated shaft was then removed from the Martian atmospheric chamber and installed in the test stand in the laboratory. As the data show, the in-situ applied perfluorinated ethylene according to the instant disclosure is superior in lubricity to pre-applied perfluorinated ethylene, which was applied by a commercial process consistent with those readily available in the art.

Figure 11:
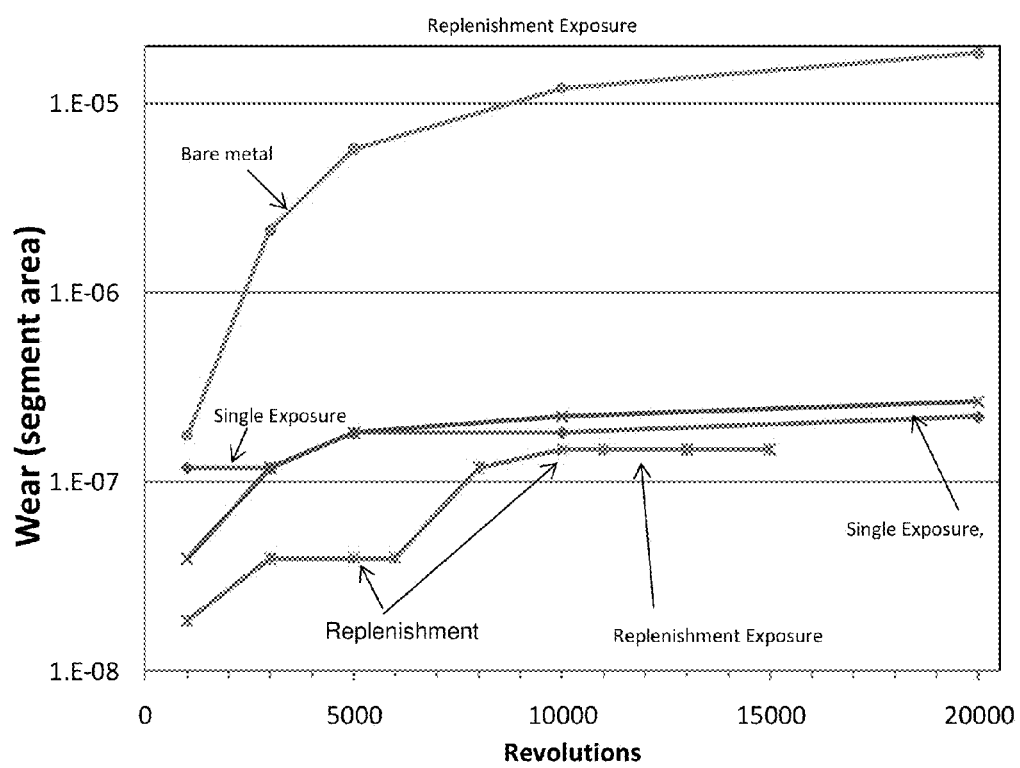
FIG. 11 is a graphical representation showing wear of replenishment exposure of inventive and comparative embodiments obtained using the testing device of FIG. 9.

A replenishment experiment was conducted to characterize the ability of the pulsed plasma lubrication device (PPL) to re-establish worn films after undergoing wear. The data are shown in FIG. 11. Results obtained indicate that the PPL can replenish the film and maintain a total wear rate lower than films pre-deposited in a single exposure.

Figure 12:
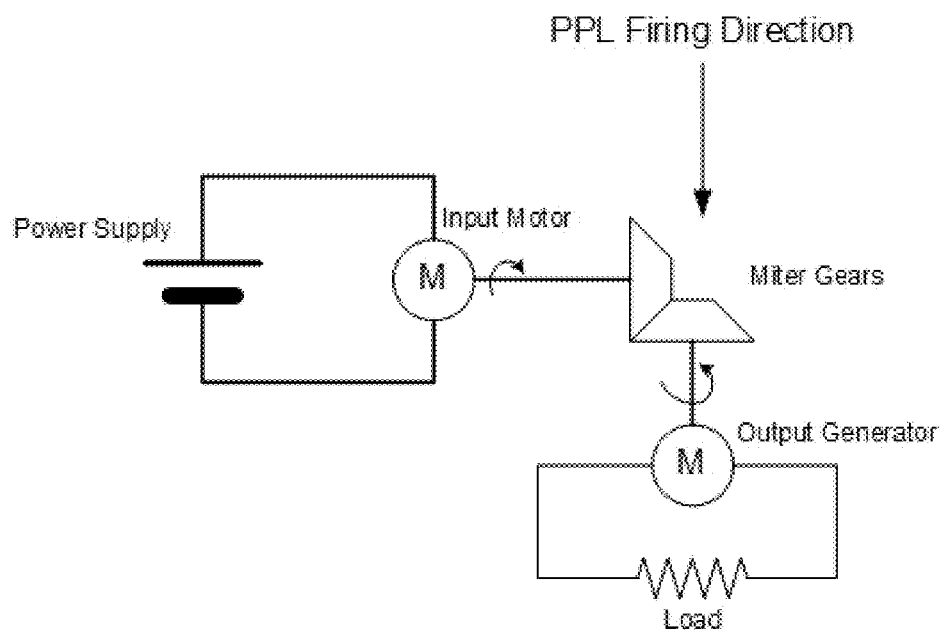
FIG. 12 is a testing device utilized to evaluate embodiments according to the instant disclosure.
Figure 13:
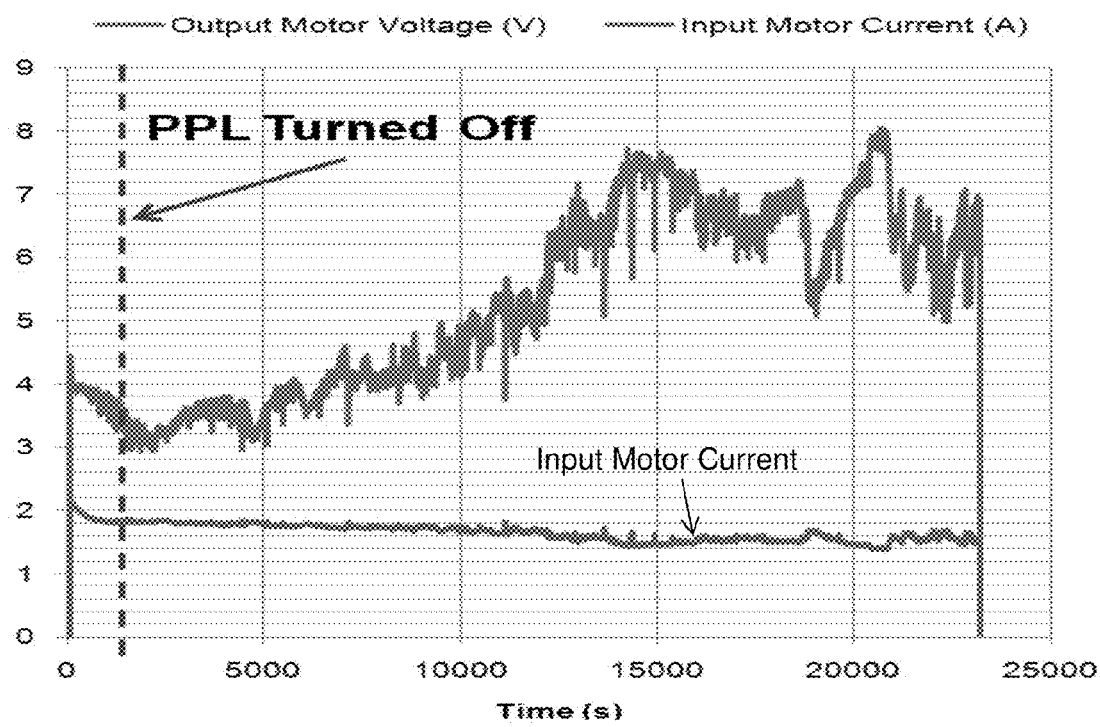
FIG. 13 is a graphical representation showing inventive data indicative of lubricity obtained using the testing device of FIG. 12.
Figure 14:
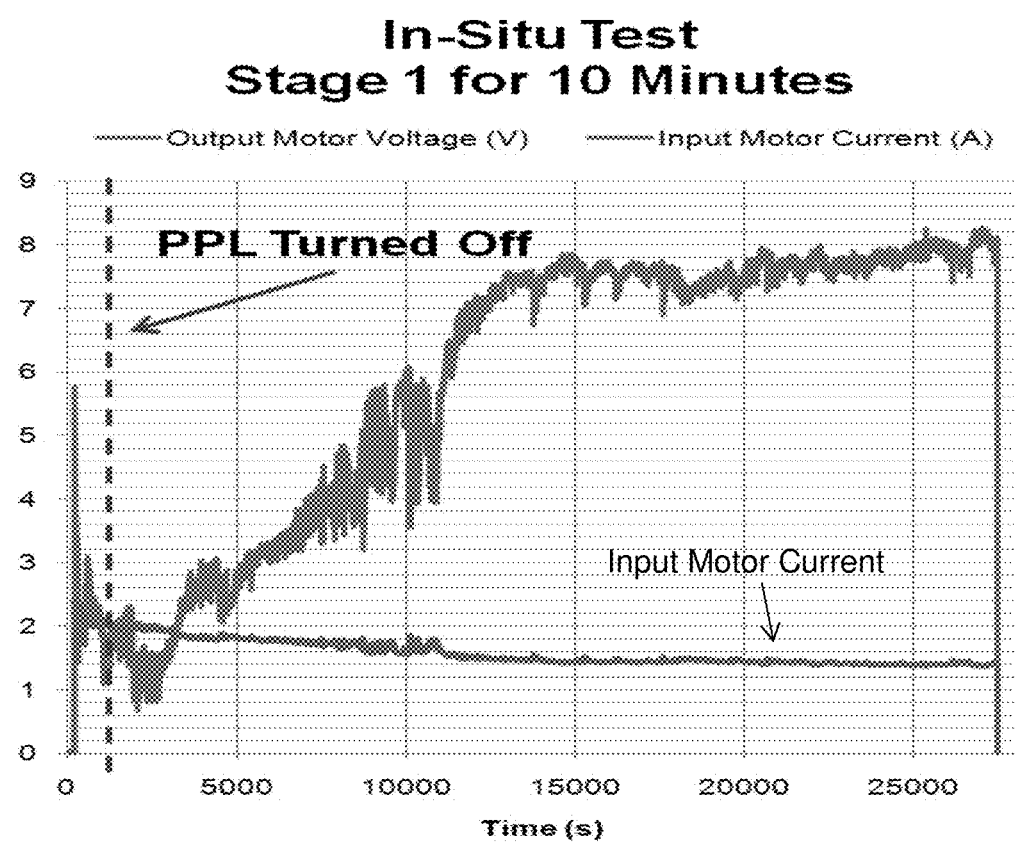
FIG. 14 is a graphical representation showing inventive data indicative of lubricity obtained using the testing device of FIG. 12.
Figure 15:
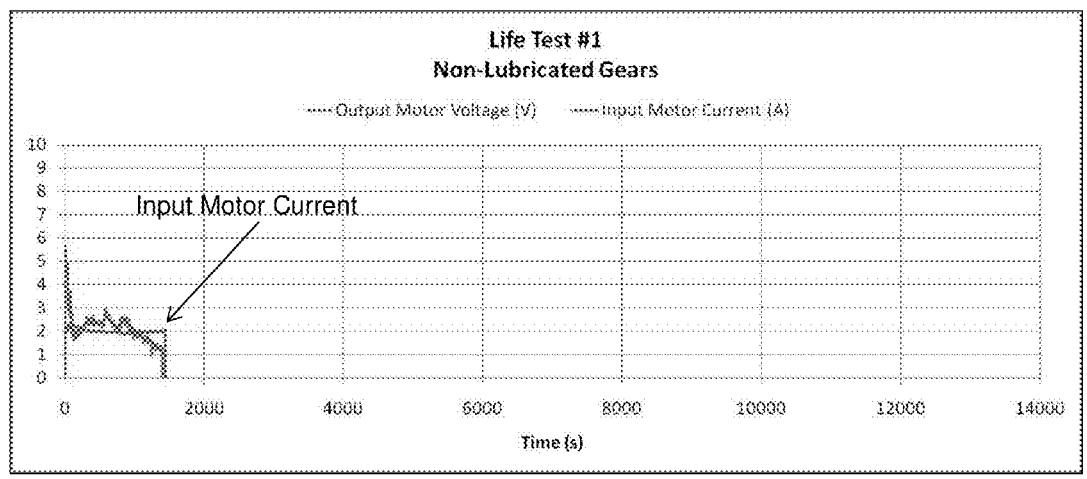
FIG. 15 is a graphical representation showing comparative or control data indicative of lubricity obtained using the testing device of FIG. 12.
Figure 16:
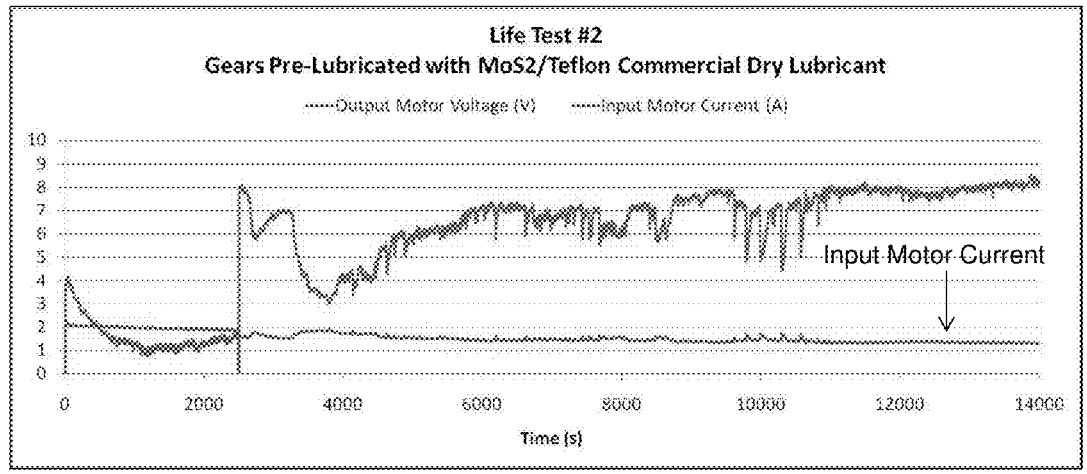
FIG. 16 is a graphical representation showing comparative data indicative of lubricity obtained using the testing device of FIG. 12.
Figure 17:
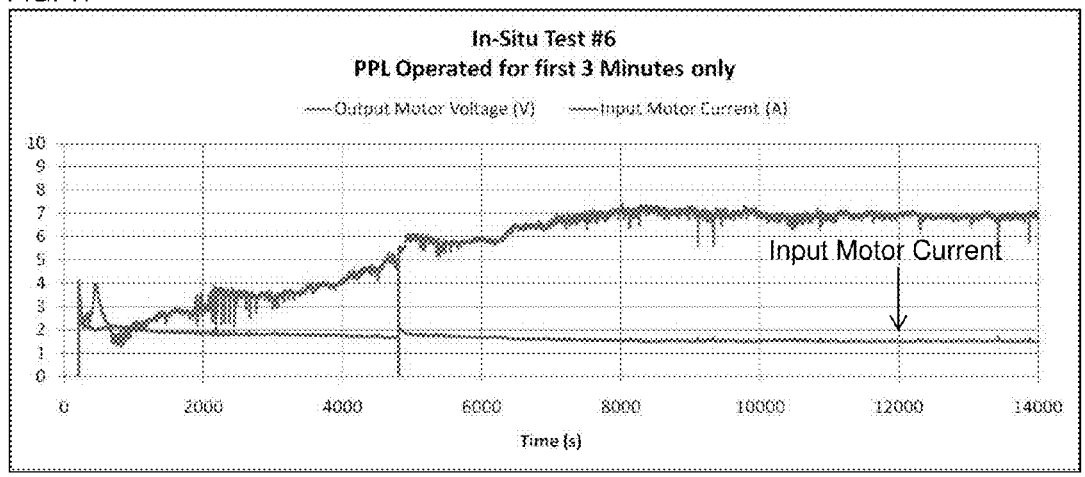
FIG. 17 is a graphical representation showing inventive data indicative of lubricity obtained using the testing device of FIG. 12.

Another set of experiments was conducted to evaluate the ability to provide multiple lubrication steps to a surface under frictional engagement and to characterize the lubricity of the films with regard to moving gears and the wear associated with such systems. The apparatus is shown in FIG. 12. In these experiments, an electric motor turned a shaft engaged with a set of miter gears. The other miter gear was attached to an output generator with a simulated load. The PPL was placed about 10 cm from the miter gears and equipped with perfluorinated ethylene as the dry lubricant. The entire apparatus was located in a chamber at a pressure of about 5 torr in $CO_2$ to simulate the Martian atmosphere and the time of lubrication being applied in-situ was varied, as shown in the figures. Bare metal gears without lubrication were used as a control. Various comparative examples and examples according to embodiments disclosed herein were evaluated. The data are shown in FIGS. 13-17. As the data in FIGS. 13 and 14 show, the gears may be coated or otherwise lubricated using the PPL during initial operation and still provide superior lubrication. As the data in FIG. 15 show, the control mechanism without lubrication fails after 20 min. FIGS. 16 and 17 show the PPL applied perfluorinated ethylene film exhibits similar performance as a pre-applied film and may also be replenished in situ.

Accordingly, in situ lubrication has been successfully executed. A surface lubricated in-situ by the PPL according to the instant disclosure exceeds a non-lubricated mechanical assembly, which fails after 10-20 minutes. The PPL also provides effective lubrication with exposure times as short as 3 minutes allowing for operation of the assembly for several hours. Furthermore, the lubricity and wear characteristics of the pulsed plasma lubrication device films are similar if not superior to pre-applied $MoS_2$/perfluorinated ethylene films.

The data demonstrate that very small amounts of lubricant may be used to achieve effective lubrication and wear utilizing the PPL according to the instant disclosure. This further confirms that the lubricant reservoir can be smaller than previously thought and that the power demand of a given PPL will be low, a few watts at most.

Figure 18:
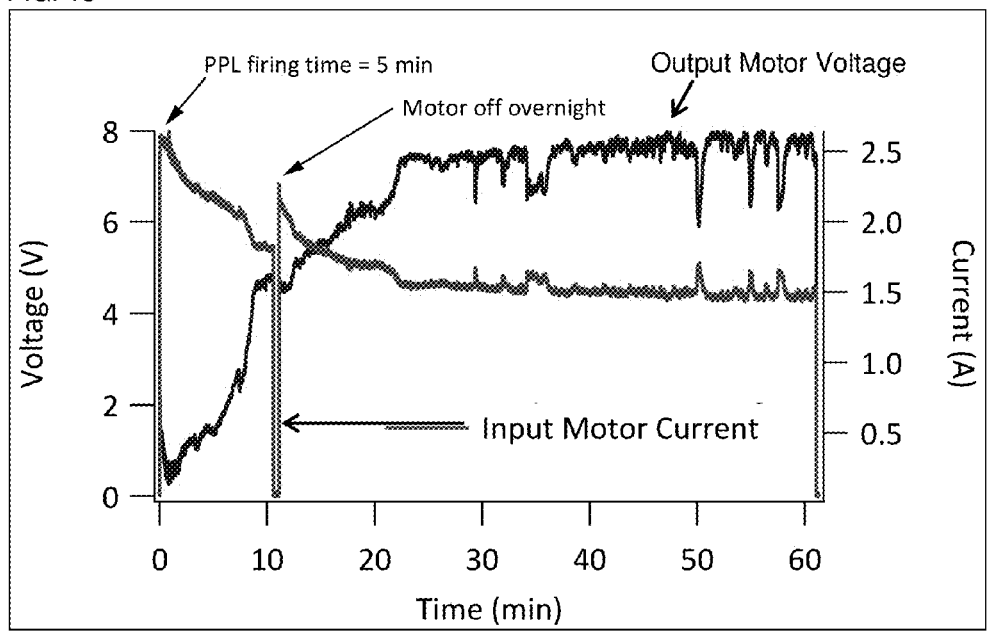
FIG. 18 is a graphical representation showing inventive data indicative of lubricity obtained using the testing device of FIG. 12, utilizing an alternative embodiment of the lubrication device.

The scalability of the PPL was demonstrated with an alternative embodiment utilising a specially modified ⅛" RF cable with perfluorinated ethylene insulation and copper conductors as the lubrication device. The lubrication device was operated with 2.2 mF capacitor (Vd=700 V, E=0.5 J) with a firing frequency of from 1 to 5 Hz at a power of from 2 to 10 watts. The data are shown in FIG. 18. As the data show, the alternative embodiment demonstrated steady-state operation of the mechanism.

It should be understood, of course, that the foregoing relates to preferred embodiments of the invention and that modifications may be made without departing from the spirit and scope of the invention as set forth in the following claims.

We claim:

1. A lubrication device, for lubricating a surface, comprising:
   a solid lubricant disposed between and in contact with a first electrode and a second electrode dimensioned and arranged such that application of an electric potential between the first electrode and the second electrode sufficient to produce an electric arc between the first electrode and the second electrode in an ambient atmosphere at an ambient pressure produces a plasma that vaporizes at least a portion of the solid lubricant to produce a vapor stream comprising solid lubricant, wherein the vapor stream is directed towards the surface to lubricate the surface.

2. The lubrication device of claim 1, wherein the solid lubricant is disposed between and in contact with a planer surface of the first electrode and a parallel planer surface of the second electrode separated by a distance equal to a thickness of the solid lubricant;
   the first electrode comprising an orifice disposed there through comprising one of a plurality of sides or one side radially arranged about a central axis and having an average inner diameter of 20% to 60% of the thickness of the solid lubricant;
   the second electrode having an average outer diameter about the central axis which is larger than the average inner diameter of the orifice;
   the solid lubricant radially arranged about the central axis and comprising a hole disposed there through from the first electrode to the second electrode, the hole comprising one of a plurality of sides or one side radially arranged about the central axis and having an average inner diameter greater than or equal to the average inner diameter of the orifice.

3. The lubrication device of claim 2, wherein the first electrode comprises one of a plurality of sides or one side radially disposed about the central axis having a first outer diameter, the second electrode comprising one of a plurality of sides or one side radially disposed about the central axis having a second outer diameter which is less than the first outer diameter, and the solid lubricant comprising one of a plurality of sides or one side radially disposed about the central axis having a third outer diameter which is greater than the second outer diameter and less than or equal to the first outer diameter.

4. The lubrication device of claim 2, wherein the hrst electrode, the second electrode, the average inner diameter of the orifice and the distance between the first electrode and the second electrode are arranged and dimensioned such that an electric potential applied between the first and second electrodes produces an electric arc between the first electrode and the second electrode in the ambient atmosphere under the ambient pressure;

wherein the electric arc forms an axial current producing an azimuthal magnetic field having an axial direction producing a radial Lorentz force which radially compresses the electric arc forming a plasma between the first and second electrode and forming an axial pressure gradient between the second electrode and the orifice;

wherein the electric arc further forms a radially diverging current present at the orifice producing an azimuthal magnetic field having a radial direction producing an axial Lorentz force which accelerates the plasma in the axial direction away from the second electrode towards the orifice at a velocity of greater than 1000 m/s; and wherein the solid lubricant absorbs radiation produced by the plasma in an amount sufficient to sublimate a portion of the solid lubricant forming the vapor stream comprising the solid lubricant which is accelerated by the pressure gradient through the orifice at a velocity below about 1000 m/s.

5. The lubrication device of claim 1 wherein the second electrode is disposed along a central axis, the first electrode having a circular cross section perpendicular to the central axis is concentrically disposed about the first electrode and the solid lubricant is uniformly dispersed between and in contact with the first electrode and the second electrode.

6. The lubrication device of claim 1, further comprising a power supply in contact with the first electrode and the second electrode capable of producing the electric arc between the first electrode and the second electrode to produce the plasma in the ambient atmosphere at the ambient pressure for a period of time sufficient to vaporize at least a portion of the solid lubricant to produce the vapor stream comprising the solid lubricant, and optionally an igniter suitable to initiate the electric arc between the first electrode and the second electrode.

7. The lubrication device of claim 1, wherein the solid lubricant comprises a perfluorinated polyolefin, a polyimide, a polyether, graphite, diamond, a metallic metal, a metallic metal alloy, a metal carbide, a metal oxide, a metal hydroxide, a metal sulfide, a metal sulfate, a metal nitride, a metal nitrate, a metal fluoride, a metal chloride, a metal bromide, a metal iodide, a metal silicate, a clay, a mineral, or a combination thereof, wherein the metal is selected from Groups 1 to 15 of the periodic table of the elements.

8. The lubrication device of claim 1, wherein the solid lubricant comprises one or more solid lubricants dispersed in a polymeric matrix selected from the group consisting of C2-C20 polyolefins, C2-C20 polyamides, C2-C20 polyesters, C2-C20 polyimides, halogenated C2-C20 polyolefins, halogenated C2-C20 polyamides, halogenated C2-C20 polyesters, and combinations thereof.

9. The lubrication device of claim 1, wherein the solid lubricant comprises graphite, diamond, polytetrafluoroethylene, a polyimide comprising pyromellitic dianhydride and 4,4' diamine diphenyl ether, polyoxymethylene, boron nitride, molybdenum disulfide, tungsten disulfide, mica, copper sulfate, silver sulfate, gold sulfate, cadmium iodide, lead iodide, a fluorinated polyolefin, copper, silver, gold, nickel, lead, tin, indium, white lead, lime, talc, bentonite, or a combination thereof.

10. The device of claim 1, wherein the ambient pressure is greater than or equal to 5 torr.

* * * * *